US009164866B2

(12) United States Patent
Snover et al.

(10) Patent No.: US 9,164,866 B2
(45) Date of Patent: *Oct. 20, 2015

(54) COMMON SOFTWARE ACTIVITY STATUS REPRESENTATION

(75) Inventors: Jeffrey P. Snover, Woodinville, WA (US); Steven P Burns, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 1130 days.

This patent is subject to a terminal disclaimer.

(21) Appl. No.: 12/402,098

(22) Filed: Mar. 11, 2009

(65) Prior Publication Data

US 2009/0177620 A1 Jul. 9, 2009

Related U.S. Application Data

(63) Continuation of application No. 11/222,471, filed on Sep. 8, 2005, now Pat. No. 7,512,895.

(51) Int. Cl.
*G06F 3/048* (2013.01)
*G06F 11/32* (2006.01)
*G06F 3/0484* (2013.01)
*G06F 3/0481* (2013.01)

(52) U.S. Cl.
CPC ............ *G06F 11/328* (2013.01); *G06F 3/0484* (2013.01); *G06F 3/0481* (2013.01); *G06F 3/04817* (2013.01)

(58) Field of Classification Search
CPC . G06F 3/0484; G06F 3/0481; G06F 3/04817; G06F 11/328

USPC .................................................. 715/771, 772
See application file for complete search history.

(56) References Cited

U.S. PATENT DOCUMENTS

| 5,854,633 | A | * | 12/1998 | Cooper et al. ................ 345/603 |
|---|---|---|---|---|
| 5,974,391 | A | * | 10/1999 | Hongawa ......................... 705/7 |
| 6,097,390 | A | * | 8/2000 | Marks ............................ 715/772 |
| 6,104,397 | A | * | 8/2000 | Ryan et al. .................... 715/846 |
| 6,275,987 | B1 | * | 8/2001 | Fraley et al. .................. 717/127 |
| 6,342,908 | B1 | * | 1/2002 | Bates et al. ................... 715/798 |
| 6,392,666 | B1 | * | 5/2002 | Hong et al. .................... 715/736 |
| 6,639,687 | B1 | * | 10/2003 | Neilsen ........................ 358/1.14 |
| 6,874,130 | B1 | * | 3/2005 | Baweja et al. ................. 715/805 |
| 6,901,558 | B1 | * | 5/2005 | Andreas et al. ............... 715/772 |
| 6,927,770 | B2 | * | 8/2005 | Ording .......................... 345/440 |
| 6,934,916 | B1 | * | 8/2005 | Webb et al. ................... 715/772 |
| 6,941,522 | B2 | | 9/2005 | Brown |
| 7,043,548 | B2 | * | 5/2006 | Bouet ........................... 709/224 |
| 7,171,628 | B1 | * | 1/2007 | Perttunen ...................... 715/853 |
| 7,242,856 | B2 | * | 7/2007 | Ishida et al. .................. 386/230 |

(Continued)

OTHER PUBLICATIONS

IEEE 100—The Authoritative Dictionary of IEEE Standards Terms Seventh Edition, published Dec. 2000.*

(Continued)

*Primary Examiner* — Tuyetlien Tran
(74) *Attorney, Agent, or Firm* — Jim Banowsky; Kate Drakos; Micky Minhas

(57) ABSTRACT

Described herein are technologies directed towards providing a common mechanism for tracking the activity status of one or more software actions of a computer system. Furthermore, the described technologies facilitate managing the presentation of the tracked activity status of individual actions and/or of a collection of such actions.

15 Claims, 4 Drawing Sheets

(56) References Cited

U.S. PATENT DOCUMENTS

| | | | |
|---|---|---|---|
| 7,274,375 B1* | 9/2007 | David | 345/619 |
| 2001/0044799 A1* | 11/2001 | Eigel-Danielson | 707/102 |
| 2001/0055017 A1* | 12/2001 | Ording | 345/440 |
| 2002/0122077 A1* | 9/2002 | Doney et al. | 345/853 |
| 2002/0143850 A1* | 10/2002 | Caronni et al. | 709/201 |
| 2002/0180795 A1* | 12/2002 | Wright | 345/772 |
| 2003/0005022 A1* | 1/2003 | Brown | 709/100 |
| 2003/0142109 A1* | 7/2003 | Brown et al. | 345/592 |
| 2003/0142143 A1* | 7/2003 | Brown et al. | 345/836 |
| 2005/0015769 A1* | 1/2005 | Gegner | 718/104 |
| 2005/0097480 A1* | 5/2005 | Care | 715/859 |
| 2005/0102631 A1* | 5/2005 | Andreas et al. | 715/772 |
| 2006/0136832 A1* | 6/2006 | Keller et al. | 715/765 |

OTHER PUBLICATIONS

Silberschatz, et al., "Operating Systems Concepts", Wiley, Dec. 14, 2004, Seventh Edition, p. 163.

* cited by examiner

COMMON SOFTWARE ACTIVITY STATUS REPRESENTATION

RELATED APPLICATION

This application is a continuation of and claims priority from U.S. patent application Ser. No. 11/222,471, titled "Common Software Activity Status Representation", filed on Sep. 8, 2005, and hereby incorporated by reference.

BACKGROUND

When a user initiates a potentially long-running action on a computing system, it is often desirable to notify the user about the status of that long-running action. For example, FIG. 1A illustrates a file-copying status notification given to a user while files are being copied/moved from one location to another. With such a notification, the user can see which files are being copied/moved from one file folder to another. Similarly, FIG. 1B illustrates an installation status notification given to a user while one or more software programs are being installed.

In addition to software installation and copying/moving files, other examples of long-running actions where it may be desirable to give the user status notification include (but are not limited to) transforming data, updating configurations, performing complex calculations, accessing a resource, installing software, downloading files, searching databases, defragmenting hard disks, performing long-running transactions over slow networks. In many software systems, there exist many different long-running actions like those described above. Long-running actions may and typically do include a series of sub-actions. With these long-running actions, it is often desirable to notify a user of their current status.

To accomplish that user-notification goal, conventional long-running actions typically utilize a dedicated status-notification user-interface (UI). Furthermore, these dedicated UIs are typically customized for their particular purpose. These UIs typically utilize visual metaphors to represent activity status. For example, the files flying from one folder to another shown in FIG. 1A illustrates the status of the file-copying activity. Similarly, the "thermometer" shown in FIG. 1B illustrates the status of the software installation.

Furthermore, in accomplishing the user-notification goal, each conventional long-running action uses its own customized mechanism for tracking its activity status. Such a mechanism may simply be storage locations for storing information about the current status of a long-running action and/or procedural definitions for how such status information is acquired and acted upon.

A common mechanism for representing and tracking the activity status of a potentially long-running action does not exist. Instead, the conventional approach is to repeatedly recreate an activity-status tracking mechanism for each application of a computer system.

SUMMARY

Described herein are technologies directed towards providing a common mechanism for tracking the activity status of one or more software actions of a computer system. Furthermore, the described technologies are for managing the presentation of the tracked status of individual actions and/or of a collection of such actions.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The same numbers are used throughout the drawings to reference like elements and features.

DETAILED DESCRIPTION

Figure 1A:
FIGS. 1A and 1B illustrate conventional visual metaphors for presenting activity-status of long-running actions, such as copying/moving files (FIG. 1A) and software installation (FIG. 1B).
Figure 1B:
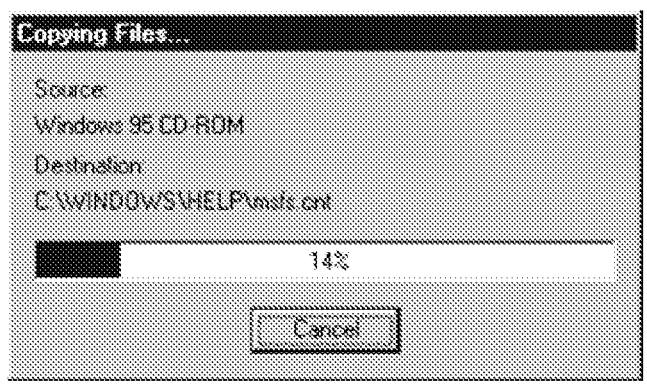

The following description sets forth techniques for providing a common mechanism for tracking the status of individual software activities of a computer system, especially where such an activity is a potentially long-running activity or series of sub-activities. Such described techniques provide support for a hierarchical set of activities or sub-activities. Any one of the activities of a hierarchical set can itself be a long-running activity with a hierarchical set of sub-activities.

The techniques described herein also provide a common mechanism for tracking the status of a collection of software activities of the computer system. Furthermore, described herein are techniques for managing the presentation of status information of the collection of tracked software activities.

The techniques described herein provide a protocol that separates the activity itself from the display of the activity's progress. Activities emit records of their progress and those records are then sent to an entity (e.g., the operating system) which decides what to do with them. This entity may render each record that it receives. It may render a subset of the received record. It may suppress the display in whole or in part. Indeed, because of this protocol, the activity-progress presentation may occur in a separate process or a separate machine.

Exemplary Software Activity Status Representation Data Structures

An exemplary software activity status representation described herein has data structures for representing the status of one or more software activities. A software activity (or simply "activity") is a high-level function being undertaken by the software. For example, a user drags a folder of files into the Recycle Bin, which initiates the "activity" of deleting each file in the folder. Activities may be grouped together into a related set of concurrent activities and may also include a subordinate set of "sub-activities" (or alternatively known as "operations").

The exemplary software activity status representation described herein includes at least two data structures: "ProgressRecord" and "PendingProgress." Also, there is a third subclass data structure called "ProgressNode." In some implementations, the ProgressNode may be part of the PendingProgress.

Of course, this is just one exemplary implementation. Other implementations may have more or less data structures for tracking and storing data as may be desired and is suitable.

Each ProgressRecord data structure is focused on representing status information for individual activities. While the PendingProgress data structure is focused on representing a cumulative status of multiple activities. A ProgressNode acts as a mechanism for transferring updated information from the ProgressRecord data structures to the PendingProgress data structure.

Using golf as an analogy, each golfer is an activity and their current score and other associated data (e.g., current hole, number of holes played, playing partners, etc.) is represented by their golf scorecard. Thus, a golfer's scorecard is analogous to an activity's ProgressRecord data structure. To continue the golf analogy, a golf tournament's leaderboard (also called a "scoreboard") displays the current scores of the golfers in the tournament. Thus, the golf leaderboard is analogous to a PendingProgress data structure, which summarizes the status of multiple activities.

When sent to the leaderboard, the ProgressRecord may be thought of as being analogous to a "note" sent from the golfer to those in tournament administration for the purposes of updating the leaderboard. This "note" provides sufficient status information for the leaderboard to be accurately updated. Meanwhile, the ProgressNode may be thought of as the leaderboard's copy of the last note received for a given golfer. The PendingProgress "leaderboard" is the collection of copies of the last "notes" received. The ProgressNode is not sent—it is kept by the PendingProgress "leaderboard" and updated from the ProgressRecords received.

ProgressRecord

The ProgressRecord is a data structure for representing the status of a particular activity at a given point in time. ProgressRecord is the "scorecard" for each activity. Each tracked activity will have a ProgressNode data structure, and each update to a tracked activity is represented with a ProgressRecord data structure.

The golfer can use a ProgressRecord as her own scorecard, but she doesn't have to. However, she does need to send a ProgressRecord to the administration for updating of the leaderboard. So, the golfer (as a metaphor here for an application or other software process) can create a ProgressRecord from whatever private scheme she is using to track her score, or she can make a copy of her ProgressRecord and send the copy.

Table A below illustrates an example of one possible organizational structure for a ProgressRecord data structure. It is provided for purposes of illustration only and not limitation.

TABLE A

| ProgressRecord |
| --- |
| – id : Int |
| – parentID : int |
| – activity : string |
| – status : string |
| – currentOperation : string |
| – percent : int |
| – secondsRemaining : int |
| – ActivityDetails: object |
| – OperationDetails: object |
| – type: ProgressRecordType |
| + ProgressRecord( ) |
| + ActivityId( ) |
| + ParentActivityId( ) |
| + Activity( ) |
| + StatusDescription( ) |

TABLE A-continued

| ProgressRecord |
| --- |
| + CurrentOperation( ) |
| + PercentComplete( ) |
| + SecondsRemaining( ) |
| + Type( ) |
| + ToString( ) |

This example ProgressRecord data structure organization of Table A includes an "id" to identify the activity that is being tracked; "parentId" to identify the tracked activity's parent (if there is any); "activity" to label the tracked activity; "status" to describe the status of the activity (e.g., "starting file copy"); "currentOperation" to specify the current operation or sub-activity; "percent" for percent completion of the activity; "secondsRemaining" for specifying the time remaining until completion.

In addition, there may be other elements of this ProgressRecord datastructure, such as ActivitityDetails and OperationDetails. With these, an activity is allowed to communicate any additional data they want to about the activity or operation. A progress viewer (or presenter) might make this information available to the user if they want to investigate the details of what is going on. For instance, it might include the biometric conditions (e.g. heartrate, blood-pressure, blood alcohol content) of the golfer for a particular hole.

Furthermore, this example ProgressRecord data structure organization of Table A includes several functions, such as "ProgressRecord"; "ActivityID" and the like.

PendingProgress

Instead of focusing on individual activities, the PendingProgress data structure focuses on a collection of activities. The PendingProgress is a data structure for representing the cumulative status of a set of related activities at a given point in time. That current status changes over time as new ProgressRecords are received to reflect changes in the status of activities. PendingProgress is the "leaderboard" for a group of activities.

Table B below illustrates an example of one possible organizational structure for a PendingProgress data structure. It is provided for purposes of illustration only and not limitation.

TABLE B

| PendingProgress |
| --- |
| – topLevelNodes: List |
| – nodeCount : int |
| – maxNodeCount: int |
| + Update( ) |
| – RemoveNode( ) |
| – AddNode( ) |
| – FindOldestNode( ) |
| – FindNodeById( ) |
| – FindOldestNodeofGivenStyle( ) |
| – AgeNodesAndResetStyle( ) |
| + Render ( ) |
| – RenderHelper( ) |
| – TallyHeight( ) |
| – AllNodesHaveGivenStyle( ) |
| – CountNodes( ) |
| – CompressToFitHelper( ) |
| – CompressToFit( ) |

This example PendingProgress data structure organization of Table B includes a "topLevelNodes," which is a list of ProgressNodes without parent activites; "nodeCount," which is the number of ProgressNodes currently being tracked;

"maxNodeCount," which is the maximum limit to the number of ProgressNodes to be tracked.

Furthermore, this example PendingProgress data structure organization of Table B includes several functions, such as "Update" and "Render" function and their several sub-functions. The Update function receives a ProgressRecord and updates the PendingProgress to reflect the new status of the activity identified by the received record. The Render function traverses the ProgressNodes in the PendingProgress structure and renders them to the user of the software.

ProgressNode

The PendingProgress data structure does not store ProgressRecord data structures. It instead represents the contents (or a superset thereof) of the ProgressRecord data structures using a subclass of ProgressRecord called "ProgressNode." The ProgressNode subclass has several additional fields used in the various activity-status procedures to track and display activity status.

Table C below illustrates an example of one possible organizational structure for a ProgressNode subclass data structure. It is provided for purposes of illustration only and not limitation.

TABLE C

ProgressNode

+ Children: List
+ Age: int
+ Style : RenderStyle
+ SourceId: long
+ ProgressNode( )
+ Render ( )
− RenderFull( )
− RenderCompact( )
− RenderMinimal( )
+ LinesRequired( )
− LinesRequiredInFullStyle( )
− LinesRequiredInCompactStyle( )

This example ProgressNode subclass data structure organization of Table C includes a "Children," which is a list of the ProgressNodes whose parentIds are the same as this particular ProgressNode's activityId; "Age," which is a counter representing the number of times this node was present in the PendingProgress structure during the update process, since the last time the ProgressRecord was received for this node's activity; "Style," which is used by the render process to decide how to show the node to the user; "SourceId" which identifies the source of the ProgressRecord that last updated this activity Furthermore, this example ProgressNode subclass data structure organization of Table C includes functions, such as a "ProgressNode" and "Render" function.

Exemplary Software Activity Status Representation System

Figure 2:
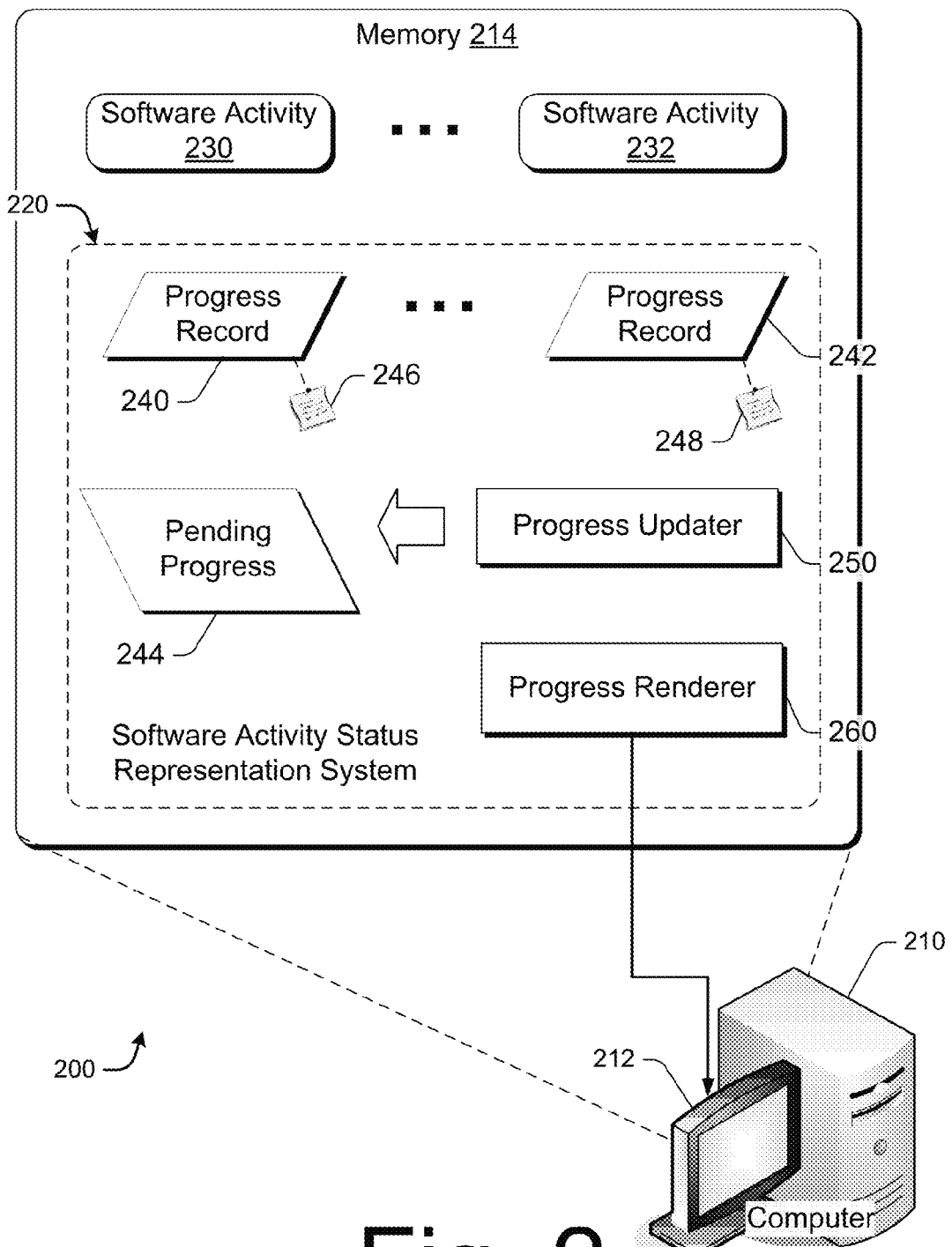
FIG. 2 illustrates an exemplary software activity representation system within the context of a suitable computing environment, in accordance with one or more implementations described herein.

Generally, FIG. 2 illustrates an example of a suitable exemplary computing environment 200 (or configuration) within which an exemplary software-activity status representation system 220, as described herein, may be implemented (either fully or partially).

The suitable exemplary computing environment 200 may include one or more general-purpose or special-purpose computing system environments or configurations. Examples of well known computing systems, environments, and/or configurations that may be suitable for use include, but are not limited to, personal computers (PCs), server computers, hand-held or laptop devices, thin clients, thick clients, multiprocessor systems, microprocessor-based systems, programmable consumer electronics, wireless phones and equipment, general and special-purpose appliances, application-specific integrated circuits (ASICs), set top boxes, personal digital assistants (PDA), appliances, programmable consumer electronics, network PCs, minicomputers, mainframe computers, distributed computing environments that include any of the above systems or devices, and the like.

As depicted in FIG. 2, this suitable exemplary computing environment 200 includes a computer 210, an output device 212 (e.g., a computer monitor), and a memory 214. The memory 214 may be any available processor-readable media that is accessible by computer 210. The memory 214 may be either volatile or non-volatile media. Also, it may be either removable or non-removable media.

Running in this memory 214 are one or more software activities, such as those represented by software activities 230 and 232. A software activity (or simply "activity") is a high-level function being undertaken by the software. For example, a user drags a folder of files into the Recycle Bin, which initiates the "activity" of deleting each file in the folder.

FIG. 2 shows the components of the exemplary software-activity status representation system 220 running in the memory 214. As illustrated here, the components of the exemplary software-activity status representation system 220 are part of the operating system (OS) of the computer 210. Of course, this is just one exemplary implementation. With other implementations, the components (independently or collectively) of the system 220 may be implemented outside the context of an OS. Furthermore, the components (independently or collectively) may be implemented by software, hardware, firmware, or some combination thereof.

The illustrated components of the exemplary software activity status representation system 200 includes various data and functional components. The data components include multiple ProgressRecord data structures (such as those represented by ProgressRecords 240 and 242), a PendingProgress data structure 244, one or more ProgressNode data structures (such as those represented by ProgressNode messages 246 and 248). These data components are described above in the section titled "Exemplary Software Activity Status Representation Data Structures The functional components of the exemplary software activity status representation system 200 include a progress updater 250 and a progress renderer 260. The progress updater 250 updates the PendingProgress data structure 244 upon receipt of a new ProgressRecord (such as ProgressNodes 246 and 248). Using the golf analogy, it updates the "leaderboard."

Using the data components, the progress renderer 260 manages the presentation of the status of a related set of activities at a given point of time or, alternatively, the changing status over time as the related data structures change. Using the golf analogy, it is the person that decides how much status information (e.g., score, location, number of holes, etc.) to post on the "leaderboard" given a presumably limited amount of space on the leaderboard on which to post such information.

Exemplary Operation Scenario

Assume there is a program for copying files and that a file-copying program wishes to notify the user of the status of the on-going copying process. Further assume that this program is capable of copying multiple files simultaneously.

The file-copying program is the "source" for status information. The OS ultimately handles the presentation of the status information, while the exemplary software-activity status representation system 220 manages the tracking of the status information and the rendering (i.e., pre-presentation) of the status information.

The file-copying program copies multiple files at once and each file is copied in chunks. Each file copy is a sub-activity or operation and each chunk of the file copy is a sub-activity or operation of it (i.e., a sub-activity of a sub-activity). As each file and chunk of file is copied, the file-copying program sends a ProgressRecord (such as is shown at 240 and 242) with the same identification (e.g., "activity id") but varies others information, such as the CurrentOperation, PercentageCompleted and SecondsRemaining to reflect the progress of the current file-copying process. The OS runs the progress updater 250 and a progress renderer 260 upon receipt of each record. The result is a display of how far along the file-copying activity has proceeded, which is updated for each file and each chunk.

Methodological Progress Updating Implementation

Figure 3:
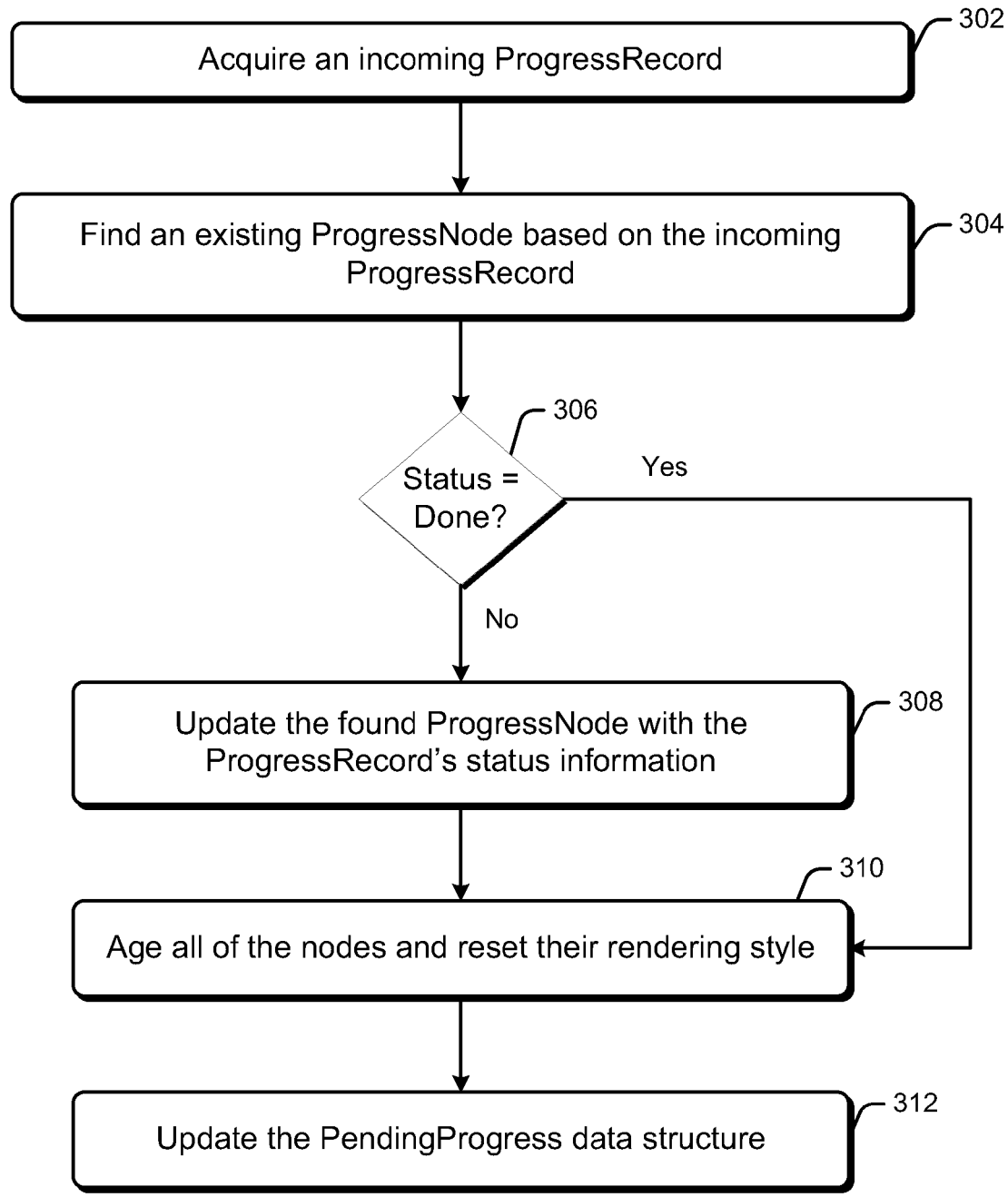
FIG. 3 illustrates a flow diagram showing a methodological implementation described herein.

FIG. 3 shows an exemplary method 300 for updating the status-tracking mechanism for one or more software activities. Of course, this exemplary method is just one of many possible implementations of the techniques described herein. This method 300 is performed by the one or more of the various components as depicted in FIG. 2. Furthermore, this method 300 may be performed in software, hardware, firmware, or a combination thereof.

For ease of understanding, this method is delineated as separate steps represented as independent blocks in FIG. 3; however, these separately delineated steps should not be construed as necessarily order dependent in their performance. Additionally, for discussion purposes, the method 300 is described with reference to FIG. 2. Also for discussion purposes, particular components are indicated as performing particular functions; however, other components (or combinations of components) may perform the particular functions.

At 302 of FIG. 3, the exemplary software-activity status representation system 220 acquires an incoming ProgressRecord, such as the data structures shown at 240 and 242. An incoming ProgressRecord is provided by the software activity whose status is being tracked or some other source aware of the status of an activity being tracked.

At 304, the system 220 finds an existing ProgressNode data structure (such as ProgressNodes 246 and 248) associated with the incoming ProgressRecord. It may find the associated ProgressNode by using one or more activity identifiers (such as "activityId" or the like). If necessary, it creates a ProgressNode for the incoming ProgressRecord.

At 306, the system 220 determines whether the subject activity (represented by the ProgressRecord and its associated ProgressNode) is "done." In other words, that subject activity indicates both 1) that it has completed 100% of its action (such as file-copying) and 2) that it no longer wishes to notify the user of its completion status.

Of course, the system 220 may perform some error-correction and data maintenance here or other points in this process so that the incoming data is well-formed and also so the relationships (e.g., parent, child, sibling) between activities are properly maintained.

At 308, the system 220 updates the found ProgressNode with the incoming ProgressRecord's status information. For example, it may update the CurrentOperation, PercentageCompleted and SecondsRemaining to reflect the progress of the activity being tracked. When a ProgressNode is updated, its "age" is reset (e.g., to zero).

At 310, the system 220 ages all of the ProgressNodes. This means that the tracked "age" of each ProgressNode is incremented. As noted above, when a ProgressNode is updated, its "age" is reset. Therefore, the least frequently updated ProgressNodes have the greatest age. A node's age is a consideration in the rendering phase.

The system also resets their rendering style, which is discussed below in the section regarding the rendering methodological implementation. In short, the rendering style is the way or style in which the status information for the activity is rendered and thus, ultimately displayed to the user.

At 312, the system 220 updates the PendingProgress data structure 244 with the new status information from the incoming updated ProgressNode. In some implementations, the ProgressNodes are part of the PendingProgress. In those instances, this step is not necessary because updating the ProgressNode necessarily updates the PendingProgress as well.

Methodological Progress Rendering Implementation

Figure 4:
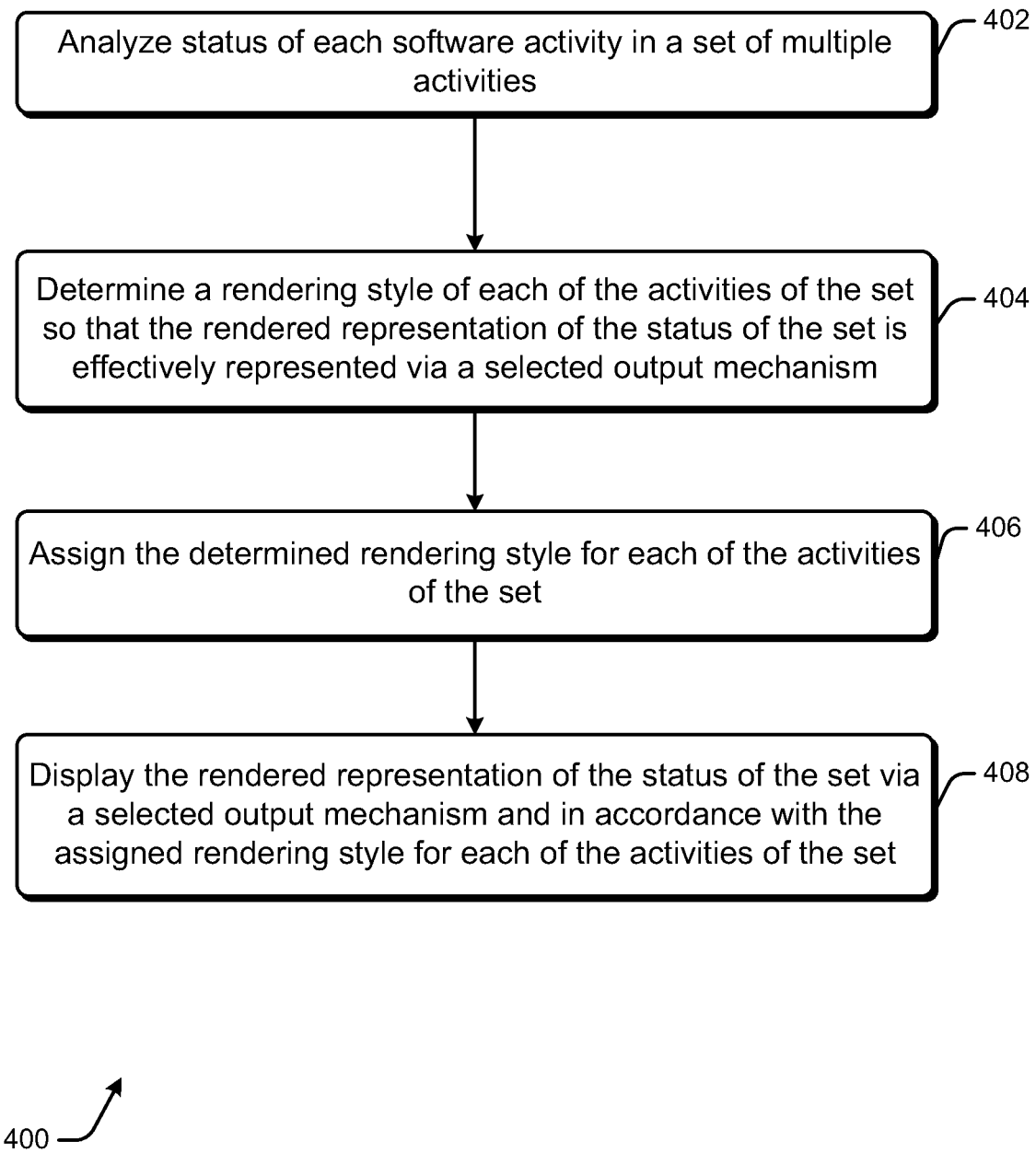
FIG. 4 illustrates a flow diagram showing another methodological implementation described herein.

FIG. 4 shows an exemplary method 400 for managing the presentation of status information of a collection of software activities. Of course, this exemplary method is just one of many possible implementations of the techniques described herein. This method 400 is performed by the one or more of the various components as depicted in FIG. 2. Furthermore, this method 400 may be performed in software, hardware, firmware, or a combination thereof.

For ease of understanding, this method is delineated as separate steps represented as independent blocks in FIG. 4; however, these separately delineated steps should not be construed as necessarily order dependent in their performance. Additionally, for discussion purposes, the method 400 is described with reference to FIG. 2. Also for discussion purposes, particular components are indicated as performing particular functions; however, other components (or combinations of components) may perform the particular functions.

At 402 of FIG. 4, the exemplary software-activity status representation system 220 analyzes the status of the software activities in a set of multiple activities. More specifically, the system traverses the PendingProgress data structure 244 and examines various aspects of each activity being tracked therein.

At 404, based upon that analysis, the system 220 determines a "rendering style" of each of the activities being tracked via the PendingProgress data structure 244. The purpose of this determination is to find an effective way to visually represent the status information for the tracked activities via a selected output mechanism so that it can be best interpreted by the user.

Also, this is done with an assumption that the output mechanism (e.g., a computer monitor) has a limited amount of displayable space (i.e., real estate). With limited resources (such as displayable space), compromises may be necessary and the system makes those compromises here in this determination.

A rendering style is the "style" in which an activity's status information is displayed. It is a specified way or style in which the status information for an activity is rendered and thus, ultimately displayed to the user. Examples of some styles include: Full, Compact, Minimal, and Invisible. The "full" style includes all status information. The "compact" style includes less status information than the full style. The minimal style includes even less still. And the invisible style indicates that the status information about an activity should not be displayed. Of course, other implementations may utilize other styles and variations of styles.

The determination about how much (e.g., none to all) status information to display for a particular activity is made here at block 404. There are many factors that may go into that determination. For example, each activity may specify or request a particular rendering style. If the system can accommodate, it will render the activity accordingly. Otherwise, the system chooses a style different than what is requested.

Another style determination factor is "age" of software activity's associated ProgressNode. The older that a ProgressNode is the longer it has been since the system has received an update regarding the status of its associated activity. For example, the system may choose to make all activities older than a specified age rendered in an "invisible" style. That way, newer status information will crowd out the older information.

Furthermore, this determination may be influenced by user interactivity. If a user indicates an interest in seeing more information related to a particular activity, then the system will determine to show more information about that activity. Conversely, if a user indicates a desire to see less information related to particular activities, then the system will determine to show less information about that activity.

Essentially, the determination here is successively "pruning" the amount of data to be displayed so that, as more concurrent activities accumulate, less detail is displayed about each activity.

At 406 of FIG. 4, the system 220 assigns the determined rendering style to each of the activities being tracked via the PendingProgress data structure 244.

At 408, the system 220 displays the rendered representation of that status of the activities being tracked via the PendingProgress data structure 244 and displays them via a selected output mechanism and in accordance with the assigned rendering style for each of the activities. The actual output may be text based output (e.g., 25 lines of 80-column text per screen) or graphical based output (e.g., text and graphics in a movable box(es) on a graphical user-interface).

Conclusion

The techniques, described herein, may be implemented in many ways, including (but not limited to) program modules, general- and special-purpose computing systems, network servers and equipment, dedicated electronics and hardware, firmware, and as part of one or more computer networks.

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

The invention claimed is:

1. A system comprising:
   a hardware processor;
   a software activity executable by the hardware processor to generate a first data structure, the first data structure including status information of the software activity, the software activity including a plurality of operations, the status information of the first data structure indicating an amount of an operation of the software activity completed;
   a progress updater executable by the hardware processor to:
      receive the first data structure from the software activity; and
      update a second data structure based on the status information of the first data structure, the second data structure specifying a cumulative status of a plurality of software activities; and
   a progress renderer executable by the hardware processor to:
      determine an amount of status information of the software activity to display as a status of the software activity changes over time, the amount of status information of the software activity to display being determined based at least in part on an age of the software activity status information indicating a time that the status information of the software activity was last automatically updated, wherein as the age of the software activity status information increases the amount of status information of the software activity to display decreases; and
      cause display of the determined amount of status information of the software activity.

2. The system of claim 1, wherein each of the plurality of operations includes a plurality of sub-operations.

3. The system of claim 2, wherein the software activity provides the first data structure to the progress updater in response to completion of a sub-operation of a particular operation of the software activity.

4. The system of claim 3, wherein the progress updater receives an additional data structure from the software activity in response to completion of an additional sub-operation of the particular operation of the software activity, and wherein the progress updater updates the second data structure based on status information of the additional data structure.

5. The system of claim 4, wherein the first data structure includes a first identification number, a first indication of a percent completion of the particular operation, and a first indication of seconds remaining until completion of the particular operation, and wherein the additional data structure includes the first identification number, a second indication of a percent completion of the particular operation, and a second indication of seconds remaining until completion of the particular operation.

6. A device comprising:
   a hardware processor; and
   a memory having computer-executable instructions stored thereupon which, when executed by the hardware processor, cause the device to:
      receive a first status record as part of an automatic progress update for a first software activity;
      receive a second status record as part of an automatic progress update for a second software activity;
      determine that a status update age of the first software activity is greater than a status update age of the second software activity based in part on receiving the second status record after receiving the first status record, wherein the status update age is based at least on when a most recent status record was received;
      decrease, based on the determining that the status update age of the first software activity is greater than the status update age of the second software activity, an amount of displayed status information of the first software activity; and
      increase, based on the determining that the status update age of the first software activity is greater than the status update age of the second software activity, an amount of displayed status information of the second software activity.

7. The device of claim 6, wherein the acts further comprise resetting the status update age of the first software activity in response to receiving the first status record, the status update age of the first software activity indicating a last time that status information of the first software activity was updated.

8. The device of claim 6, wherein the acts further comprise rendering the amount of displayed status information of the first software activity according to a first style that displays less than a totality of status information of the first software activity and rendering the amount of displayed status information of the second software activity according to a second style that displays a totality of status information of the second software activity.

9. A method comprising:
acquiring, at a computer executing a software activity status representation system, a first status update as part of an automatic progress update to a first software activity;
acquiring, at the computer after acquiring the first status update, a second status update as part of an automatic progress update to a second software activity;
determining that an update age of the first software activity is greater than an update age of the second software activity based in part on acquiring the second status update after acquiring the first status update;
determining, at the computer and based on the update age of the first software activity being determined to be greater than the update age of the second software activity, a first rendering style for the first software activity, the first rendering style visually representing a first amount of status information of the first software activity;
determining, at the computer and based on the update age of the first software activity being determined to be greater than the update age of the second software activity, a second rendering style for the second software activity, the second rendering style visually representing a second amount of status information of the second software activity, the second amount of status information being greater than the first amount of status information based in part on the determination that the update age of the first software activity is greater than the update age of the second software activity; and
assigning the first software activity to be rendered according to the first rendering style and the second software activity to be rendered according to the second rendering style.

10. The method of claim 9, further comprising:
rendering the first amount of status information of the first software activity according to the first rendering style at the computer; and
rendering the second amount of status information of the second software activity according to the second rendering style at the computer.

11. The method of claim 9, further comprising rendering the second amount of status information of the second software activity according to the first rendering style in response to user input received at the computer.

12. The method of claim 9, further comprising rendering the second amount of status information of the second software activity according to a third rendering style in response to user input received at the computer, wherein the third rendering style specifies visually representing a third amount of status information that is less than the second amount of status information.

13. The method of claim 9, wherein the first software activity and the second software activity are executing concurrently.

14. The method of claim 9, wherein the first rendering style is an invisible style that prevents first software activity status information from being displayed.

15. The method of claim 14, further comprising implementing the invisible style if an update age of a software activity is equal to or greater than a threshold update age.

* * * * *